Oct. 27, 1925.
E. E. RICHARDSON
WEATHER GUARD
Filed Feb. 18, 1922
1,558,759
2 Sheets-Sheet 1
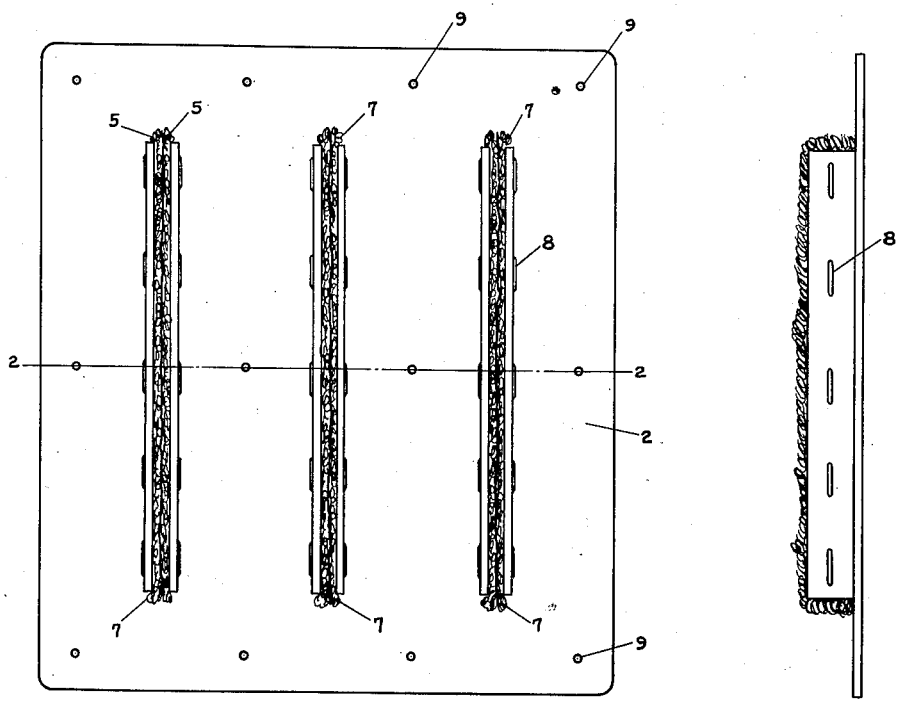
Fig.1
Fig.3
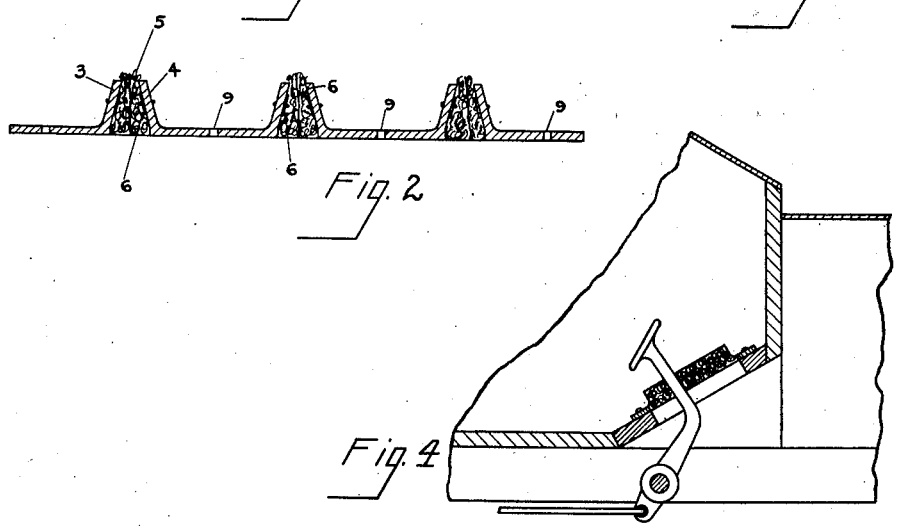
Fig.2
Fig.4
EDWARD E. RICHARDSON  INVENTOR.
BY Richey Slough &Tales
His ATTORNEYS Oct. 27, 1925.

E. E. RICHARDSON

WEATHER GUARD

Filed Feb. 18, 1922

EDWARD E. RICHARDSON INVENTOR.

BY
ATTORNEYS

Patented Oct. 27, 1925.

1,558,759

UNITED STATES PATENT OFFICE.

EDWARD EDWARD RICHARDSON, OF MAUMEE, OHIO, ASSIGNOR OF FIFTY-ONE PER CENT TO F. O. RICHEY, OF ELYRIA, OHIO.

WEATHER GUARD.

Application filed February 18, 1922. Serial No. 537,408.

*To all whom it may concern:*

Be it known that I, EDWARD EDWARD RICHARDSON, a citizen of the United States, residing at Maumee, in the county of Lucas and State of Ohio, have invented certain new and useful Improvements in Weather Guards, of which the following is a full, clear, concise, and exact description, such as will enable others skilled in the art to which my invention appertains to make and use the same.

My invention relates to weather guards in general and is especially applicable for use as foot board weather guards for an automobile to prevent drafts and dust from passing through the slots in the foot board through which the pedals and levers project.

Among the objects of my invention are the following—

To provide a flexible mat with flexible flanges between which the pedals or levers of the automobile project;

To provide a special packing between said flanges;

To provide other details of improvement tending to increase the efficiency and serviceability of a device of the above character.

To accomplish the foregoing and other useful ends, my invention comprises means hereafter more fully set forth and claimed. Referring to the accompanying drawings—

Fig. 1 is a top view of the mat.

Fig. 2 is a section on line 2—2 of Fig. 1.

Fig. 3 is a side view of the device of Fig. 1.

Fig. 4 shows a side elevation of a section of an automobile showing a pedal, and my device in position, the device being shown in sectional elevation..

Figure 5:
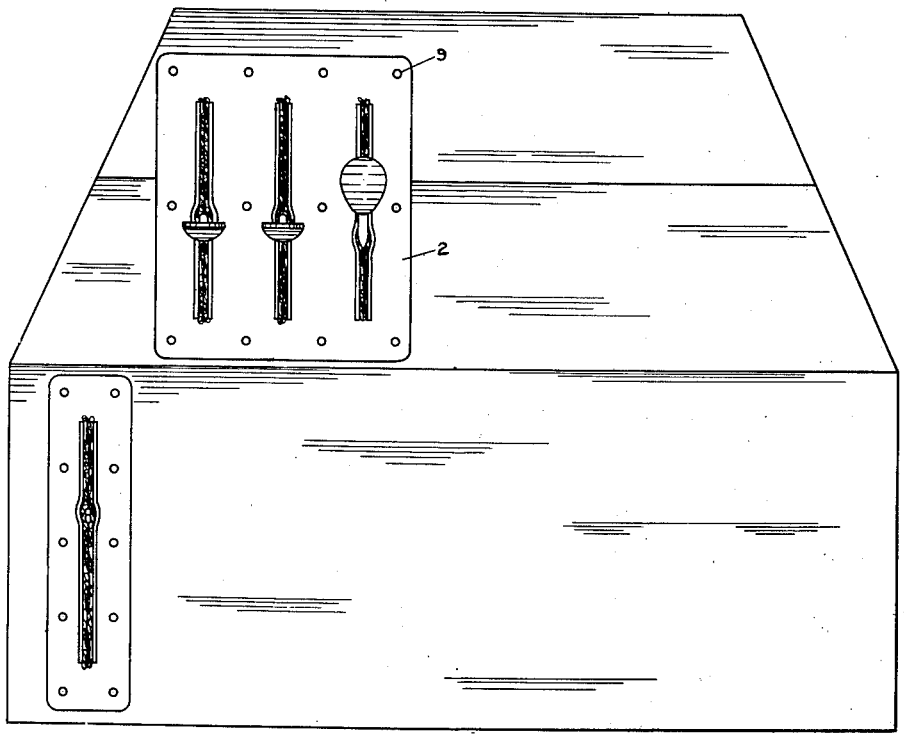
Fig. 5 is a top view of the foot board and floor of an automobile showing one form of my device in position having three slots, and another form of the device having only one slot.

Referring more in detail to the drawings—

I provide a mat 2 of flexible material such as rubber. This mat is provided with one or more sets of flanges 3 and 4 projecting outwardly. These flanges may be of any suitable length, and may be cast integral with the pad 2. Preferably these flanges are lined with a packing 5. This packing is provided in longitudinal sections, see Fig. 1, or strips, a strip being secured in any suitable manner to each one of the flanges on the inside. The flanges 3 and 4 being flexible, and constructed with a tension towards each other, the slots in the mat 2 are kept always closed. The arms of the pedals or levers protrude or project through the slots between these layers of packing, completely encircling the same, thus completely shutting off any circulation by way of these slots.

As the lever or pedal is moved in the slot back and forth, the flanges and packing readily yield so as to permit the levers or pedals to reciprocate without creating a permanent opening between the layers of the packing.

Although any suitable packing material may be employed, I find that very superior results are obtained by using sheep hide with the wool on. These strips of hide 6 may be secured to the flexible flanges 3 and 4 in any suitable manner. They may be riveted, or sewed, or laced with wire or twine or thread or the like.

In order to insure against leakage at the heads 7 of the slots, I can provide the hide of such length as to protrude just beyond the flexible flanges, thereby providing a projecting wad of wool which will close up the margins as well as the lineal portions of the slots. This is particularly indicated at the terminals 7 in Fig. 1.

In the embodiment of my invention herein illustrated, I have secured the hide which carries the wool to the flexible flanges by means of wire lacing shown at 8. This wire lacing may be continuous for each flange, or may consist of a number of different staples having their prongs bent inwardly to secure the hide to the flanges.

I find that a mat constructed as herein described, prevents air from being admitted through the slots of the floor board through which the pedal members pass, thus contributing to the comfort of the automobile driver; also I find that sheep's wool as a material has the advantage of being very durable, and at the same time presents very little friction to the pedal arms engaging the sheep's wool surfaces.

In the embodiment of my invention illustrated, I have shown perforations 9, a number of which may pass through the mat body 2 for the purpose of admitting screws or other securing means to secure the mat to the floor board, or floor of the vehicle.

If desired, the mat may be secured to the floor in any other desired way such as by having a clamping frame engaging its marginal portions, said clamping frame being secured to the floor in any suitable way.

Having thus described my invention in a specific embodiment thereof, I am aware that numerous and extensive departures may be made from said embodiment herein illustrated and described, but without departing from the spirit of my invention.

What I claim as my invention is:—

1. A mat for an automobile foot board provided with substantially parallel flanges cast integral therewith protruding from the surface of the mat, said flanges constructed of flexible material and tensioned toward each other, a slot in said mat between said flanges whereby a reciprocating member may project through said mat between said flanges and via said slot.

2. A mat for an automobile foot board, substantially parallel flanges projecting from the surface of said mat, packing material between said flanges, said flanges constructed with tension to maintain the packing under compression.

3. An automobile foot mat provided with a pair of flanges protruding from the face thereof, said flanges disposed substantially parallel to each other, a strip of packing material on each flange in the space between the flanges, said flanges constructed with tension for maintaining the said strips of packing against each other.

4. An automobile foot mat provided with a pair of flanges protruding from the face thereof, said flanges disposed substantially parallel to each other, a strip of packing material on each flange in the space between the flanges, said flanges constructed with tension for maintaining the said strips of packing against each other, each strip of packing consisting of sheep hide with the wool on.

5. A mat of rubber or rubber composition for an automobile foot board provided with substantially parallel upstanding flexible flanges cast integral therewith, protruding from the surface of the mat and forming a slot in the mat between the flanges for the pedal shank of the automobile, said flanges adapted to maintain a draft barring closure of said slot and to permit the pedal shaft to move in said slot without admitting the draft.

6. An automoble foot mat provided with a pair of resilient flanges protruding from the face thereof, said flanges disposed parallel to each other, a strip of packing material on each flange in the space between the flanges, each of said flanges normally exerting pressure towards the adjacent side of the other flange.

7. A mat for an automobile foot board provided with substantially parallel flanges projecting upwardly from the surface of the mat, said substantially parallel flanges being tensioned towards each other, a slot in the mat between said flanges whereby a reciprocating automobile controlling foot pedal member may project through said mat and be reciprocated in said slot, said flanges being faced with sheep wool hide on their inner faces, said hide carrying sheep's wool, said sheep's wool being adapted to close the opening over said slot, and around said pedal member.

8. An automobile foot mat provided with a pair of flanges protruding from the face thereof, said flanges disposed substantially parallel to each other, a strip of packing material on each flange in the space between the flanges, said packing material comprising sheep's wool attached to sheep's hide, said sheep's hide being secured to the flanges with the wool surfaces extending from each flange pressed together.

9. An automobile footmat having a slot therein, a pair of flanges projecting from the same face of the mat and extending one along each side of the slot, woolly material attached to the adjacent faces of the flanges and in engagement at the unattached surfaces to close the slot against drafts but to permit the reciprocation of a brake or other pedal shaft in said slot.

10. An automobile footmat having a slot therein wherethrough a brake or other pedal shaft is reciprocated, and woolly material in said slot barring the passages of air therethrough but permitting the movement of said shaft.

11. A mat of the character described comprising a sheet of rubber, a set of spaced parallel ribs molded integrally with and upon the upper face of the sheet, said ribs each having a central longitudinal slit, the walls of each slit being yieldable.

12. A mat for an automobile foot board provided with substantially parallel upstanding flanges cast integral therewith protruding from the surface of the mat, said flanges constructed of flexible material, a slot in said mat between said flanges whereby a reciprocating member may project through said mat between adjacent sides of said flanges and via said slot.

13. A lever guard of the type indicated made up as a single molding of rubber comprising a body portion having a slot therethrough through which the lever may project, and flanges at opposite sides of said slot adapted to hug the lever for the purpose set forth.

14. A lever guard of the type indicated made up as a single molding of rubber comprising a body portion having a slot therethrough through which the lever may project, and flanges at opposite sides of said slot projecting upwardly from the body and being normally inclined toward and against each other to thereby hug the lever for the purpose set forth.

15. In a device of the class described the combination of a support, a pair of resilient flanges standing up from said support and a slot therebetween, and densely matted fibrous material mounted on the inside of each flange and normally engaging the mass of fibrous material mounted on the opposite flange, said flanges normally tensioned towards each other and normally pressing said fibrous material together to bar the passage of air, dust, dirt, etc. through the slot between the flanges but permitting the movement of a pedal shaft therein.

16. In a device for preventing the passage of air through a pedal shaft slot in an automobile and at the same time not obstructing the passage of said shaft, the combination of a base and a pair of strips of sheep's hide with the wool thereon mounted on either side of said slot and embracing the pedal shaft with the wool side turned inward and the hide part attached to the base.

In witness whereof I have hereunto signed my name this 16th day of February, 1922.

EDWARD EDWARD RICHARDSON.